United States Patent
Ramberg et al.

(10) Patent No.: US 7,760,432 B2
(45) Date of Patent: Jul. 20, 2010

(54) PHOTOCHROMIC RESISTANT MATERIALS FOR OPTICAL DEVICES IN PLASMA ENVIRONMENTS

(75) Inventors: Randy J. Ramberg, Roseville, MN (US); Theodore Broberg, New Brighton, MN (US)

(73) Assignee: Honeywell International Inc., Morristown, NJ (US)

( * ) Notice: Subject to any disclaimer, the term of this patent is extended or adjusted under 35 U.S.C. 154(b) by 1214 days.

(21) Appl. No.: 10/131,881

(22) Filed: Apr. 25, 2002

(65) Prior Publication Data

US 2003/0202248 A1      Oct. 30, 2003

(51) Int. Cl.
    *G02B 1/10*      (2006.01)
(52) U.S. Cl. .................. 359/580; 359/584
(58) Field of Classification Search .......... 354/584, 354/580, 581; 428/213
    See application file for complete search history.

(56) References Cited

U.S. PATENT DOCUMENTS

| | | | | |
|---|---|---|---|---|
| 4,161,560 A * | 7/1979 | Kienel | ............... | 428/213 |
| 5,104,832 A * | 4/1992 | Michel et al. | ............... | 501/103 |
| 5,313,483 A * | 5/1994 | Kozlovsky et al. | ............ | 372/99 |
| 5,457,570 A * | 10/1995 | Lu et al. | ............... | 359/361 |
| 5,646,780 A | 7/1997 | Crook et al. | | |
| 5,764,416 A * | 6/1998 | Rahn | ............... | 359/586 |
| 5,835,273 A | 11/1998 | Chaton et al. | | |
| 5,978,141 A * | 11/1999 | Karwacki | ............... | 359/586 |
| 6,166,390 A * | 12/2000 | Quapp et al. | ............ | 250/506.1 |
| 6,424,419 B1 * | 7/2002 | Tazartes et al. | ............. | 356/473 |

FOREIGN PATENT DOCUMENTS

EP      0 372 438      6/1990

\* cited by examiner

*Primary Examiner*—Joshua L. Pritchett
(74) *Attorney, Agent, or Firm*—Fogg & Powers LLC

(57) ABSTRACT

An optical device, such as an interference mirror of the type which can be incorporated into ring laser gyros. One embodiment is an interference mirror having at least one layer formed from a matrix of material consisting of $ZrO_2$ and about 2-15 weight percent of $Al_2O_3$.

12 Claims, No Drawings

PHOTOCHROMIC RESISTANT MATERIALS FOR OPTICAL DEVICES IN PLASMA ENVIRONMENTS

FIELD OF THE INVENTION

The present invention is an optical device, such as an interference mirror, formed from a matrix including $ZrO_2$ and another large heat of formation material such as $Al_2O_3$.

BACKGROUND OF THE INVENTION

Laser mirrors, such as interference mirrors used in ring laser gyroscopes, are continually exposed to a high-energy plasma environment that degrades the mirror by reducing the oxide (removing oxygen) and by inducing photochromic losses. Optical devices of this type are formed from a "quarter wave" stack of alternating ¼ λ-thickness layers of a relatively high index of refraction material and a relatively low index of refraction material. These layers of material are often deposited on a dielectric substrate by vacuum deposition processes.

To reduce the degradation effects, metal oxides with a relatively high bonding energy to oxygen such as zirconium oxide ($ZrO_2$) are typically used as the high index of refraction material. A layer of $ZrO_2$ is also often typically used as the top layer of the stack in interference mirrors. $ZrO_2$ has a relatively large heat of formation (about −131,490 gram calories/mole of oxygen), and exhibits a relatively high resistance to degradation in plasma environments. $ZrO_2$ is also compatible with the relatively high temperatures (e.g., 450°-550° C.) to which the mirrors are exposed during other ring laser gyro manufacturing steps. Another approach for minimizing the degradation effects involves coating the top layer of the mirror stack with $Al_2O_3$, another relatively large heat of formation material (about −134,693 gram calories/mole of oxygen).

Unfortunately, the $ZrO_2$ tends to form a micro-crystalline structure when deposited. This micro-crystalline structure creates scattering sites, increasing the loss of the mirror. One known approach for preventing the formation of the crystalline structure and producing an amorphous, low-scatter material is to dope the $ZrO_2$ with small amounts of a second material such as $SiO_2$. Doping the $ZrO_2$ with a relatively low amount (e.g., 5-15 weight %) of $SiO_2$ in this manner inhibits the micro-crystalline structure, thereby enabling relatively low loss, low scatter and long life mirrors.

The bonding energy of $SiO_2$ is so different with respect to that of $ZrO_2$, however, that the $SiO_2$ is reduced in the presence of a significant energy source such as a plasma environment. This interaction can lead to photochromic loss increase which can degrade the performance of the mirror. The result is a decrease in the performance of the ring laser gyro or other system in which the optical device is used.

There is, therefore, a continuing need for improved mirrors and other optical devices used in high energy applications. In particular, there is a need for mirrors with relatively low scatter and loss when used in the plasma environments. The mirrors should also be capable of relatively long life. To be commercially viable, any such mirrors must be capable of being efficiently fabricated.

SUMMARY OF THE INVENTION

In one aspect, the present invention is an optical device formed from a matrix including $ZrO_2$ and a second metal oxide having large heat of formation. Suitable metal oxides include $HfO_2$, $TiO_2$, and $Al_2O_3$. The second metal oxide is incorporated into the matrix at 2 to 15 weight percent, preferably 4 to 11 weight percent, and most preferably 6 to 9 weight percent. In one embodiment, the optical device consists essentially of $ZrO_2$ and $Al_2O_3$.

In another aspect, the present invention is an interference mirror including a layer formed from a matrix including $ZrO_2$ and a second metal oxide having large heat of formation. Suitable metal oxides include $HfO_2$, $TiO_2$, and $Al_2O_3$. The second metal oxide is incorporated into the matrix at 2 to 15 weight percent, preferably 4 to 11 weight percent, and most preferably 6 to 9 weight percent. In one embodiment, the mirror consists essentially of $ZrO_2$ and $Al_2O_3$.

DETAILED DESCRIPTION OF THE PREFERRED EMBODIMENTS

It has been discovered that by incorporating an amount of certain metal oxide "glass former" materials such as $Al_2O_3$ (aluminum oxide) that has a binding energy that is close to that of $ZrO_2$, an amorphous, non-naturally occurring material can be fabricated that provides relatively low scatter and low photochromic loss characteristics when used in high energy environments.

One embodiment of the present invention is an improved optical device having a homogeneous matrix of material including as its constituent compounds $ZrO_2$ and a second metal oxide having large heat of formation, such as $Al_2O_3$. It is to be understood that $SiO_2$ is not considered a metal oxide. The amount of metal oxide in the material is an amount which is effective to minimize microcrystalline structure formation without significantly reducing the effective index of refraction of the material. $SiO_2$ is not included in the material matrix. One embodiment of the invention includes about 2-15 weight percent of $Al_2O_3$ in the matrix. Another preferred embodiment includes about 4-11 weight percent of $Al_2O_3$ in the matrix. Yet another embodiment of the invention includes about 6-9 weight percent $Al_2O_3$ in the matrix.

Conventional or otherwise known processes, such as RF ion beam or other vapor deposition processes, can be used to form the matrix of material. One preferred embodiment is a sputtering process (e.g., ion beam sputtering) where the composition of the deposited film mimics the composition of the target. It is anticipated that other deposition techniques can be used with modified compositions to compensate for different evaporation rates. Co-deposition techniques can also be used.

Preferred embodiments of the invention consist solely of the $ZrO_2$ and $Al_2O_3$ compounds described above. However, it is anticipated that other elements or compounds can be incorporated into the matrix of material as well. Introduction of dopants into the matrix is known to alter physical, optical and electrical properties of the material.

Although suitable for a wide range of optical devices, the material is very useful in interference mirrors (e.g., "quarter wave" stacks) incorporated into ring laser gyros. In particular, an interference mirror having a top layer formed by a matrix of $ZrO_2$ and $Al_2O_3$ having the composition described above exhibits relatively low loss, low scatter and long life characteristics in a plasma environment. The photochromic loss of the laser is thereby significantly reduced, enhancing the power output of the device. The thickness of the layer is determined by the particular application for which the interference mirror is designed (i.e., the wavelength of light desired to be reflected).

$Al_2O_3$ is the large heat of formation metal oxide incorporated into the matrix in the preferred embodiment of the invention described above. However, it is anticipated that other metal oxides can be effectively used for this purpose as well. By way of example, one such metal oxide is hafnium dioxide ($HfO_2$), which has a heat of formation of −134,190 gram calories per mole per oxygen. Other suitable metal oxides include, for example, titanium dioxide ($TiO_2$) and niobium oxide ($Nb_2O_5$).

Although the present invention has been described with reference to preferred embodiments, those skilled in the art will recognize that changes can be made in form and detail without departing from the spirit and scope of the invention.

What is claimed is:

1. A ring laser gyroscope, comprising an interference mirror having a top layer with a homogeneous matrix of material including $ZrO_2$ and an amount of a second metal oxide having large heat of formation.

2. The ring laser gyroscope of claim 1 wherein the amount of the second metal oxide in the matrix of material is an amount which is effective to inhibit microcrystalline structure formation during interference mirror manufacture.

3. The ring laser gyroscope of claim 2 wherein the amount of the second metal oxide in the matrix of material is an amount which causes the interference mirror to exhibit relatively low photochromic behavior characteristics.

4. The ring laser gyroscope of claim 1 wherein the second metal oxide is selected from the group consisting of $HfO_2$, $TiO_2$, and $Al_2O_3$.

5. The ring laser gyroscope of claim 1 wherein the second metal oxide includes $Al_2O_3$.

6. The ring laser gyroscope of claim 5 wherein the matrix of material includes between about 2-15 weight percent of $Al_2O_3$.

7. The ring laser gyroscope of claim 5 wherein the matrix of material includes between about 4-11 weight percent of $Al_2O_3$.

8. The ring laser gyroscope of claim 5 wherein the matrix of material includes between about 6-9 eight percent of $Al_2O_3$.

9. The ring laser gyroscope of claim 1 wherein the matrix of material consists essentially of $ZrO_2$ and $Al_2O_3$.

10. The ring laser gyroscope of claim 9 wherein the matrix of material includes between about 2-15 weight percent of $Al_2O_3$.

11. The ring laser gyroscope of claim 9 wherein the matrix of material includes between about 4-11 weight percent of $Al_2O_3$.

12. The ring laser gyroscope of claim 9 wherein the matrix of material includes between about 6-9 weight percent of $Al_2O_3$.

* * * * *

UNITED STATES PATENT AND TRADEMARK OFFICE
CERTIFICATE OF CORRECTION

PATENT NO. : 7,760,432 B2
APPLICATION NO. : 10/131881
DATED : July 20, 2010
INVENTOR(S) : Ramberg et al.

Page 1 of 1

It is certified that error appears in the above-identified patent and that said Letters Patent is hereby corrected as shown below:

At Claim 8, Column 4, line 10, please replace "about 6-9 eight percent" with --about 6-9 weight percent--

Signed and Sealed this
Twentieth Day of March, 2012

David J. Kappos
*Director of the United States Patent and Trademark Office*